E. DOLENSKÝ.
COUPLING FOR PIPES AND THE LIKE.
APPLICATION FILED NOV. 23, 1908.
1,014,053.
Patented Jan. 9, 1912.
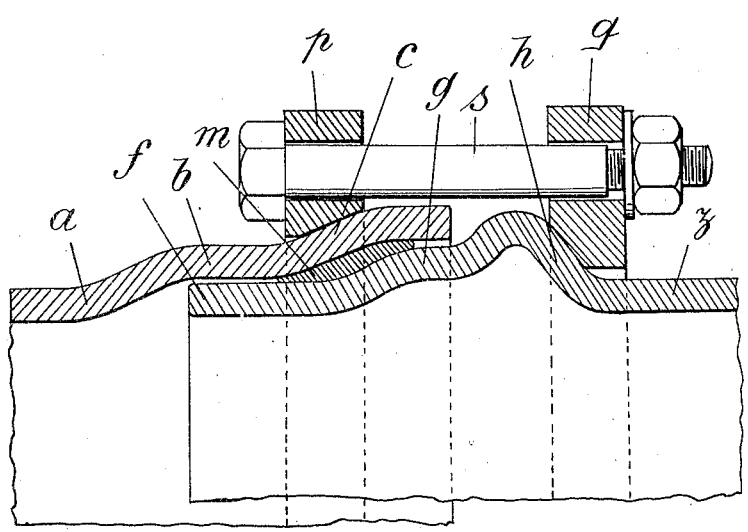

UNITED STATES PATENT OFFICE.

EUGEN DOLENSKÝ, OF FRANKFORT-ON-THE-MAIN, GERMANY, ASSIGNOR TO THE CORPORATION OF DELLWIK-FLEISCHER WASSERGAS-GESELLSCHAFT M. B. H., OF FRANKFORT-ON-THE-MAIN, GERMANY.

COUPLING FOR PIPES AND THE LIKE.

1,014,053. Specification of Letters Patent. Patented Jan. 9, 1912.

Application filed November 23, 1908. Serial No. 463,994.

*To all whom it may concern:*

Be it known that I, EUGEN DOLENSKÝ, engineer, and resident of Frankfort-on-the-Main, Germany, (whose post-office address is Wielandstrasse No. 40,) have invented new and useful Improvements in Couplings for Pipes and the Like, of which the following is a specification.

Ordinary plain sleeve couplings for pipes have the disadvantage that the pipe ends when connected are capable of axial movement with reference to one another and furthermore, that special devices are necessary in order to force the packing material into the cylindrical space between the pipe ends. On the other hand flanged couplings have the disadvantage that they are expensive if the flanges project from sleeves which are welded to, or otherwise integral with the pipes, while the packing of the adjoining faces is uncertain.

The coupling of the present invention presents the advantages of both a sleeve coupling and a flanged coupling and also affords particular advantages not possessed by either of those two types of coupling.

The invention is illustrated in the accompanying drawing.

A portion of the pipe $a$ near the end is enlarged to form a cylindrical sleeve $b$ and from this sleeve there extends a divergent conical portion $c$. The end $f$ of the other pipe $z$ maintains its original cylindrical form and is provided with a conical enlargement $g$ which corresponds to the conical enlargement $c$ of the other pipe end. In rear of the conical enlargement $g$ there is a further enlargement $h$ which constitutes a spring bead extending around the outer surface of the pipe or tube. $m$ is packing material and $p$ and $q$ are flanges or rings which are placed on to the pipes to be connected and drawn together by means of screw bolts $s$. These rings or flanges $p$ and $q$ lie respectively against the enlargements $c$ and $h$ as shown in the drawing. It will be particularly noted that the conical portion of each pipe section is formed as an enlargement or expansion of the body of the pipe of substantially the same thickness as the said body portion, that is to say the enlargements forming the conical seats for the packing on the one hand and for the flanges or clamping rings on the other are formed in the pipe ends without materially thickening the walls of the pipe sections.

The arrangement affords the following advantages. Inasmuch as the sleeve-like enlargements $c$ and $h$ serve as bearings for the flanges $p$ and $q$, the cost of the coupling as compared with one having solid sleeves is considerably less. The coupling may be rendered exceedingly strong and efficient without the necessity of machining the packing faces in consequence of the packing material $m$ being forced by the pressure of the screw bolts with wedge-like action against the tube surfaces. The coupling possesses spring-like action owing to the fact that the bead $h$ possesses a notable amount of resiliency. Furthermore, the screw bolts $s$ may be of a greater length than is the case when the flanges are formed on the outer tube ends, and in consequence of this its elasticity comes more into play. This spring action not only serves to take up the extension and contraction of the tube due to heating and cooling, but materially assists in rendering the coupling tight and permits of automatic adjustment. The coupling can with equal advantage serve for tubes of either large or small diameter. The jointing operation is exceedingly simple for all diameters of tubes.

Now what I claim and desire to secure by Letters Patent is the following:

1. A pipe coupling comprising an outer member having a divergent end section, an inner telescoping member having a convergent section and an adjacent cylindrical section to form a packing chamber tapering in opposite directions between the respective members, said telescoping member having a shoulder to the rear of the said sections, a packing substantially filling said chamber, coöperating rings and bolts connecting the respective sections.

2. A pipe coupling, comprising an outer member having a divergent section and an adjacent cylindrical section, an inner telescoping member having a convergent section and an adjacent cylindrical section to form a packing chamber tapering in opposite directions, between the respective members, said telescoping member having a shoulder to the rear of said sections, a packing substantially filling said chamber, rings engaging the outer surfaces of the divergent portion of the first member and the shoulder of the second member respectively, and bolts connecting said rings.

3. In couplings for pipes and the like the combination of a conical sleeve coupling one part of which is enlarged to a cylindrical sleeve with a divergent conical extension while the other part is cylindrical and provided with a conical elastic enlargement with a flanged coupling substantially as and for the purpose described.

4. In couplings for pipes and the like the combination of a conical sleeve coupling one part of which is enlarged to a cylindrical sleeve with a divergent conical extension while the other part is cylindrical and provided with a conical elastic enlargement with flanges arranged on the conical parts of the pipe ends, substantially as and for the purpose described.

5. In couplings for pipes and the like the combination of a conical sleeve coupling one part of which is enlarged to a cylindrical sleeve with a divergent conical extension while the other part is cylindrical and provided with a conical elastic enlargement with flanges arranged on the conical parts of the pipe ends, and connected by screw bolts substantially as and for the purpose described.

6. In couplings for pipes and the like the combination of a conical sleeve coupling one part of which is enlarged to a cylindrical sleeve with a divergent conical extension while the other part is cylindrical and provided with a conical elastic enlargement with flanges arranged on the conical parts of the pipe ends and connected by long screw bolts.

In testimony, that I claim the foregoing as my invention, I have signed my name in presence of two witnesses, this sixth day of November 1908.

EUGEN DOLENSKÝ.

Witnesses:
ARTHUR MORT,
ERWIN FICKE.